US010633546B2

(12) United States Patent
Black

(10) Patent No.: US 10,633,546 B2
(45) Date of Patent: Apr. 28, 2020

(54) WATERBORNE SHOP PRIMER

(71) Applicant: Valspar Sourcing, Inc., Minneapolis, MN (US)

(72) Inventor: David Black, Blaine, MN (US)

(73) Assignee: The Sherwin-Williams Company, Cleveland, OH (US)

(*) Notice: Subject to any disclaimer, the term of this patent is extended or adjusted under 35 U.S.C. 154(b) by 0 days.

(21) Appl. No.: 15/019,640

(22) Filed: Feb. 9, 2016

(65) Prior Publication Data

US 2016/0160057 A1    Jun. 9, 2016

Related U.S. Application Data

(63) Continuation of application No. PCT/US2014/050892, filed on Aug. 13, 2014.

(60) Provisional application No. 61/869,494, filed on Aug. 23, 2013.

(51) Int. Cl.
| | |
|---|---|
| *C08G 59/54* | (2006.01) |
| *C09D 5/00* | (2006.01) |
| *C09D 5/08* | (2006.01) |
| *C09D 5/10* | (2006.01) |
| *C09D 5/24* | (2006.01) |
| *C09D 163/00* | (2006.01) |
| *C09D 177/00* | (2006.01) |
| *C23C 30/00* | (2006.01) |

(52) U.S. Cl.
CPC ............ *C09D 5/084* (2013.01); *C08G 59/54* (2013.01); *C09D 5/008* (2013.01); *C09D 5/10* (2013.01); *C09D 5/24* (2013.01); *C09D 163/00* (2013.01); *C09D 177/00* (2013.01); *C23C 30/005* (2013.01); *B05D 2202/00* (2013.01)

(58) Field of Classification Search
CPC .... B05D 2202/00; C09D 5/084; C09D 5/008; C09D 5/10; C09D 163/00; C09D 5/24; C09D 177/00; C08G 59/54; C23C 30/005
See application file for complete search history.

(56) References Cited

U.S. PATENT DOCUMENTS

| | | | |
|---|---|---|---|
| 4,079,163 A | 3/1978 | Tanaka et al. | |
| 4,277,284 A | 7/1981 | Ginsberg et al. | |
| 4,436,878 A | 3/1984 | Wolfgang et al. | |
| 4,474,606 A | 10/1984 | McKaveney | |
| 4,476,260 A | 10/1984 | Salensky | |
| 4,544,581 A | 10/1985 | Pelloski | |
| 4,629,753 A | 12/1986 | Quinn | |
| 4,888,056 A | 12/1989 | Van Der Kolk et al. | |
| 5,098,938 A | 3/1992 | Savin | |
| 5,424,355 A | 6/1995 | Uemae et al. | |
| 5,442,005 A | 8/1995 | Brugarolas et al. | |
| 5,580,371 A | 12/1996 | Falberg | |
| 5,906,864 A * | 5/1999 | Osterhold | C08G 59/50 427/410 |
| 6,008,462 A | 12/1999 | Soltwedel | |
| 6,342,558 B1 | 1/2002 | Grandhee | |
| 6,440,331 B1 | 8/2002 | Carano et al. | |
| 6,468,336 B1 | 10/2002 | Fiedler et al. | |
| 6,715,196 B2 | 4/2004 | Reising et al. | |
| 6,762,230 B2 | 7/2004 | Brandenburger | |
| 7,736,538 B2 | 6/2010 | Gros et al. | |
| 2004/0062873 A1 | 4/2004 | Jung et al. | |
| 2006/0058423 A1 | 3/2006 | Gros | |
| 2006/0135686 A1 | 6/2006 | Killilea | |
| 2007/0259166 A1 | 11/2007 | Killilea | |
| 2007/0259188 A1 | 11/2007 | Wu | |
| 2008/0199723 A1 | 8/2008 | Cho et al. | |
| 2013/0026213 A1 | 1/2013 | Prevost et al. | |
| 2013/0122212 A1 | 5/2013 | Marty | |

FOREIGN PATENT DOCUMENTS

| | | |
|---|---|---|
| EP | 0317684 | 5/1989 |
| EP | 1191075 | 9/2001 |
| EP | 1191074 | 3/2002 |
| EP | 2198982 | 6/2010 |
| JP | 2001279166 | 10/2001 |
| JP | 2007022058 | 2/2007 |
| WO | 1998058028 | 12/1998 |
| WO | 0136552 | 5/2001 |
| WO | 2003022940 | 3/2003 |
| WO | 2006134679 | 12/2006 |

OTHER PUBLICATIONS

Cook, Michael, "Formulating Novel Aqueous Epoxy Resin Systems for Metal Primer Applications", Air Products, http://www.halox.com/formulations/files/Waterborne%20Epoxy%20Primer%20based%20on%20SW-111.pdf, paper presented at the 6th Nurnburg Congress on Apr. 2001.*
International Search Report and Written Opinion for related International Application No. PCT/US2014-050892, dated Nov. 12, 2014. (10 pages).
International Preliminary Report on Patentability for International Application No. PCT/US2011/031628, dated Oct. 9, 2012. (9 pages).
Procopio, Waterborne Acrylics for Maintenance and Protective Coatings; Moving Beyond Light duty, Journal of Protective Coatings & Linings, Jul. 2013, Society for Protective Coatings, pp. 18-37.
Yshield EMR-Protection, Aug. 2009, Retrieved from the Wayback Machine, http://web.archive.org/web/20100120013701/http://www.yshield.eu/pdf/YSHIELD-EN-ShieldingPaints.pdf.
Extended European search report for application No. 17208531.8, dated Feb. 23, 2018 (10 pages).
Database WPI; Week 200224; Thomson Scientific, London, GB; SN 2002-181875 XP002777654 (2002), 2 pages.
J.D. Elmore et al., "Waterborne Epoxy Protective Coatings for Metal," JCT: Journal of Coatings Technology, vol. 74, No. 931 (Aug. 2002), p. 63-72.

(Continued)

Primary Examiner — Patrick D Niland

(57) ABSTRACT

A coating system for application to metal components prior to assembly or fabrication into large metal objects is described. The system includes a composition comprising a water-dispersible polymer component, a crosslinking agent, and a conductive material. When applied to a metal substrate, the coating system is weldable and provides optimal corrosion resistance during fabrication or assembly.

13 Claims, No Drawings

(56) References Cited

OTHER PUBLICATIONS

M.J. Watkins et al., "Formulating High-Performance Waterborne Epoxy Coatings," found online at https://www.trfa.org/erc/docretrieval/uploadedfiles/Technical%20Papers/2006%20Meeting/Watkins-Hexion_paper.pdf; (dated Sep. 11-12, 2006, retrieved on Jan. 26, 2018); 28 pages.

"EPIKURE Epoxy Curing Agents," Product Bulletin, published by Momentive Specialty Chemicals Inc., found online at http://newenglandresins.com/wp-content/uploads/2012/03/EPIKURE-Product-Overview-MSC-112-081011-1.pdf; (dated 2011, retrieved on Jan. 26, 2018), 12 pages.

Extended European search report for application No. 14838212.0, dated Jul. 13, 2017 (12 pages).

Kunihiro et al., Feb. 2007, Machine translation of JP 2007-022058 A from http://dossier1.ipdl.inpit.go.jp/AIPN/odse-top-dn.ipdl?N0000=7400 (14 pages).

Search Report issued for European application No. 11715811.3, dated May 9, 2018 (9 pages).

\* cited by examiner

WATERBORNE SHOP PRIMER

CROSS-REFERENCE TO RELATED APPLICATIONS

This application is a continuation of International Application No. PCT/US2014/050892 filed 13 Aug. 2014, which claims priority to U.S. Provisional Application Ser. No. 61/869,494 filed on 23 Aug. 2013, each of which is incorporated herein by reference in its entirety.

BACKGROUND

Intermodal cargo containers (also referred to as dry cargo containers, freight or shipping containers) are reusable transport and storage units for moving products and raw materials between locations, including between countries. Intermodal cargo containers are standardized to facilitate intermodal transport such as among marine transport, freight train transport, and freight truck transport.

Containerization has provided global commerce with many benefits. Shipped goods move more easily and cheaply. Manufacturers know that goods loaded at one location can be readily unloaded at the destination. Cargo security has been improved, as containers are usually sealed and can be locked to discourage tampering and theft. Containers also have a longer service life, and there is a stronger market for used containers. Additionally, the costs of cargo containers themselves are lowered because a manufacturer can make these in larger volume knowing that potential customers are available all over the world.

Several international standards have been created to promote international containerization. For instance, the International Organization for Standardization (ISO) has promulgated applicable standards including R-668 to define terminology, dimensions, and ratings; R-790 to define identification markings; R-1161 to recommend corner fittings; and R-1897 to set forth dimensions for general purpose containers. Other standards include ASTM D5728-00, ISO 9897 (1997); ISO 14829 (2002); ISO 17363 (2007); ISO/PAS 17712 (2006); ISO 18185 (2007); and ISO/TS 10891 (2009). An international specification for coating/paint performance is provided by Institute of International Container Lessors (IICL). See also International Organization for Standardization (ISO), Freight Containers, Vol. 34 of ISO Standards Handbook, 4$^{th}$ Ed., 2006, ISBN 92-67-10426-8; and Levinson, Marc, *The Box: How the Shipping Container Made the World Smaller and the World Economy Bigger*, Princeton, N.J., Princeton University Press, 2006, ISBN 0691123241. Each of these standards and publications, and all other publications referenced herein, is incorporated herein in their entirety for all purposes.

Intermodal cargo containers are typically assembled by welding together a number of individual metal components. To prevent corrosion during welding, the components are cleaned (for example, by shot-blasting) and then coated with primer compositions that provide temporary corrosion protection. Such compositions are known as shop primers and allow primed components to be welded through the primer layer without having to remove the primer coating near the weld. After welding and assembly, the primer coating near the weld may be removed to allow inspection of the welded area. The inspected area may be over-coated with a primer and optionally, a topcoat to provide extended corrosion protection and the desired aesthetic appearance.

Welding is typically performed using automated welding equipment, especially where repetitive assembly steps are common. Automatic welding equipment is, however, prone to malfunction when the surface to be welded is non-uniform. This leads to defects or holes burned through the metal during welding, or localized failure to form welds.

Conventional shop primers are solvent-based epoxy compositions. Water-based systems have been unable to satisfy the applicable performance demands and/or standards. Consequently, only solvent-based coating systems have found widespread commercial acceptance in the industry. The container industry retains a strong bias against using prior proposed water-based coating systems.

With increased environmental awareness, there is a strong desire to develop improved technology that would allow use of water-based coating systems as shop primers. Significant challenges remain. As one serious challenge, it has been very difficult to formulate water-based shop primers that show acceptable adhesion and corrosion resistance while also being weldable.

From the foregoing, it will be appreciated that what is needed in the art is a coating system for use as a shop primer that is water-based and provides optimal corrosion resistance and weldability.

SUMMARY

The present description provides, in one aspect, a coating system comprising a two-component coating composition that includes a water-dispersible polymer and a polyamide resin dispersed in an aqueous carrier. In some embodiments, the coating composition is substantially free of metallic zinc. In some embodiments, the coating composition includes a conductive pigment.

In another aspect, the present description provides a coating system comprising a two-component coating composition that includes an epoxy resin having molecular weight (Mn) of 800 to 1500 and epoxy equivalent weight (EEW) of about 200 to about 500, and a polyamide having amine equivalent weight of about 250. The epoxy resin and polyamide resin are dispersed in an aqueous carrier.

In yet another aspect, the present description provides a coated metal article comprising a metal substrate with a coating composition applied thereon. The coating composition includes an epoxy resin having molecular weight (Mn) of 800 to 1500 and EEW of about 200 to about 500, and a polyamide having amine equivalent weight of about 250. The epoxy resin and polyamide resin are dispersed in an aqueous carrier.

The present description provides a method of making a coated metal article, including the steps of providing a metal substrate, applying on the substrate a two-component coating composition that includes an epoxy resin having molecular weight (Mn) of 800 to 1500 and EEW of about 200 to about 500, and a polyamide having amine equivalent weight is about 250. The epoxy resin and polyamide resin are dispersed in an aqueous carrier. The applied coating is dried to provide a corrosion-resistant film on the substrate surface.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The details of one or more embodiments of the invention are set forth in the accompanying drawings and the description below. Other features, objects, and advantages of the invention will be apparent from the description and drawings, and from the claims.

Selected Definitions

Unless otherwise specified, the following terms as used herein have the meanings provided below.

The term "substantially free" of a particular component or ingredient, as used herein, means that the compositions described herein contain less than about 5 wt % of the recited component, based on the total weight of the composition. The term "essentially free" of a particular component or ingredient means that the compositions described herein contain less than about 1 wt % of the recited component, based on the total weight of the composition.

The term "air dryable" when used with respect to a coating composition means that a layer of the composition applied to a metal substrate may be cured or hardened by allowing the composition to stand undisturbed for one day at room temperature to provide a tack-free continuous film over the substrate.

As used herein, the term "conductive," when used with respect to a material means that a dispersion of such material in a waterborne coating composition will provide increased conductivity or reduced volume resistivity such that a metal substrate coated with the composition will be weldable or more readily weldable.

The term "defect-free" when used with respect to welded components joined through a weld bead means that the weld bead does not exhibit holes burned through the bead by elevated welding heat or localized regions within the weld bead where a weld fails to form.

The term "water-dispersible" in the context of a water-dispersible polymer means that the polymer can be mixed into water (or another aqueous carrier) to form a stable mixture. For example, a mixture that readily separates into immiscible layers is not a stable mixture. The term "water-dispersible" is intended to include the term "water-soluble." In other words, as used herein, a water-soluble polymer is also considered to be a water-dispersible polymer. Compositions that undergo mild settling or other separation of components if allowed to stand undisturbed for lengthy periods of time (i.e. a month or more) but which return to a uniform state on stirring are considered "dispersed." The term "water-reducible" is used interchangeably herein with "water-dispersible."

The term "dispersion" in the context of a dispersible polymer refers to the mixture of a dispersible polymer and a carrier. The term "dispersion" is intended to include the term "solution."

The term "thermoplastic" refers to a material that melts and changes shape when sufficiently heated and hardens when sufficiently cooled. Such materials are typically capable of undergoing repeated melting and hardening without exhibiting appreciable chemical change. In contrast, a "thermoset" refers to a material that is cross-linked and does not "melt."

As used herein, the term "ethylenic unsaturation" or "ethylenically unsaturated" refers to the presence of carbon to carbon double bonds or auto-oxidative carbon-carbon double bond functionality. The carbon to carbon double bond can be in an aliphatic or cycloaliphatic compound, or in an aliphatic or cycloaliphatic side chain, substituent or other moiety. The carbon to carbon double bond can be part of vinyl, allyl or acrylate functionality, such as, for example, methacrylate, methallyl, (meth)acrylate, (meth)allyl and similar functionality.

Unless otherwise indicated, a reference to a "(meth)acrylate" compound (where "meth" is bracketed) is meant to include both acrylate and methacrylate compounds.

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

The term "volatile organic compound" ("VOC") refers to any compound of carbon, excluding carbon monoxide, carbon dioxide, carbonic acid, metallic carbides or carbonates, and ammonium carbonate, which participates in atmospheric photochemical reactions. Typically, volatile organic compounds have a vapor pressure equal to or greater than 0.1 mm Hg. As used herein, "volatile organic compound content" ("VOC content") means the weight of VOC per volume of the coating solids, and is reported, for example, as kilograms (kg) of VOC per liter. As used herein, the term "low VOC" when used with respect to a liquid coating composition means the composition means that the composition contains less than about 7 wt % volatile organic compounds, more preferably less than about 5 wt % VOC, based on the total weight of the liquid composition.

The term "primer," as used herein, refers to a coating composition that may be applied to a metal substrate and dried, cross-linked or otherwise hardened to form a tack-free continuous film with sufficient adhesion to the substrate surface.

Unless otherwise indicated, the term "polymer" includes both homopolymers and copolymers (i.e., polymers of two or more different monomers).

A "one-component" or "one part" composition, as used herein, refers to a liquid coating composition that may be applied to a substrate as is and hardened to form a tack-free continuous film over the substrate, without requiring the addition of another separately packaged component such as a crosslinker or curing agent. By way of contrast, a "two-component" or "two-part" composition refers to a liquid coating composition where the composition is made up of two components stored in separate containers. The abbreviations "1K" and "2K" are used herein to describe one-component and two-component coatings, respectively.

The term "epoxy equivalent weight" ("EEW"), as used herein, refers to the amount of a polymeric binder or resin (in grams) which contains one chemical equivalent of an epoxy functional group. The abbreviation EEW is used interchangeably with the term herein.

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

The present description provides a coating system and methods that include a two-component coating composition comprising a water-dispersible component and a polyamide resin dispersed in an aqueous carrier. The coating composition is substantially free of metallic zinc.

In an embodiment, the present description includes a coating system comprising a two-component coating composition. In an aspect, the two components include a water-dispersible component and a crosslinker or curing component. The water-dispersible component is preferably a polymeric resin or binder. The crosslinker or curing component is preferably a polymeric resin or binder capable of reacting with the water-dispersible component to form a cured film of the coating composition. In an embodiment, the crosslinker or curing component is preferably water-dispersible.

In an embodiment, the two-component coating composition described herein is a waterborne emulsion (i.e., latex polymer) that includes a water-dispersible or water-reducible polymer or binder resin and a crosslinker. Suitable polymers for use in waterborne emulsions include, for example, ethylenically unsaturated resins, epoxy resins, alkyd resins, polyesters, polyurethanes, polysilanes, mixtures thereof, and the like. In an aspect, a suitable polymer includes one or more functional groups capable of reacting with an external crosslinker. Suitable crosslinkers for use in the waterborne emulsions described herein include, for example, hydroxyl-reactive curing resins such as phenoplasts, amino-functional compounds, isocyanate-functional compounds, dianhydrides, or mixtures thereof. In an aspect, the crosslinker may be waterborne or water-dispersible.

In an embodiment, the water-dispersible or water-reducible polymer or binder resin is an epoxy or epoxy-functional resin. Suitable waterborne epoxy-functional resins include, without limitation, 2K epoxy-functional resins, 1K epoxy-functional resins and the like. In an aspect, where a zinc-free composition is required, the 2K epoxy-functional resin may be free of zinc, such as, for example, products commercially available as the ANCAREZ™ line of resins from Air Products (Allentown, Pa.).

In an aspect, the water-dispersible or water-reducible polymer or binder resin includes an epoxy or epoxy-functional resin having molecular weight desirably in the range from about 100 to 10,000, more preferably about 500 to 5,000, most preferably from about 800 to 1500. As used herein, molecular weight refers to the number average molecular weight (Mn) unless otherwise expressly noted.

In an aspect, the water-dispersible or water-reducible polymer or binder resin includes an epoxy or epoxy-functional resin with epoxy equivalent weight (EEW) desirably in the range of about 100 to 1000, more preferably 200 to about 500.

In an embodiment, the water-dispersible or water-reducible emulsion described herein includes polymers derived from one or more ethylenically unsaturated monomers. Suitable ethylenically unsaturated monomers include, for example, acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, hydroxyethyl acrylate, hydroxyethyl methacrylate, hydroxybutyl acrylate, hydroxybutyl methacrylate, glycidyl methacrylate, 4-hydroxybutyl acrylate glycidyl ether, 2-(acetoacetoxy)ethyl methacrylate (AAEM), diacetone acrylamide, acrylamide, methacrylamide, methylol (meth)acrylamide, styrene, α-methyl styrene, vinyl toluene, vinyl acetate, vinyl propionate, allyl methacrylate, and mixtures thereof. Preferred monomers include styrene, methyl methacrylate, methacrylic acid, acetoacetoxy ethyl methacrylate, butyl acrylate, and the like.

In an aspect, the polymer derived from one or more ethylenically unsaturated monomers includes polyfunctional monomers. Suitable examples include, without limitation, dipropylene glycol diacrylate (DPGDA), propoxylated glyceryl triacrylate (GPTA), pentaerythritol tetraacrylate, dipentaerythritol tetraacrylate, mixtures thereof, and the like. Preferred polyfunctional acrylate monomers include pentaerythritol tetraacrylate, dipentaerytritol tetraacrylate, and the like.

In an embodiment, the water-dispersible or water-reducible component of the coating system may be an inorganic component. Exemplary inorganic components include, without limitation, inorganic silicates, polysilanes, combinations thereof, and the like. In an aspect, the inorganic component is an inorganic metal silicate, where a metallic material is dispersed in a glassy silicate matrix. Exemplary metal silicates of this type include inorganic zinc silicate (IOZ), commercially available as CZ 1589 (Hempel), ZINCANODE (Dulux), INTERPLATE (Akzo Nobel), and the like.

In an embodiment, the water-dispersible or water-reducible component of the coating system is a polysilane. Suitable polysilanes include organofunctional polysilanes, for example. In an aspect, the organofunctional polysilane may be combined with other functional additives to provide a component with the desired properties. Exemplary organofunctional polysilanes include, without limitation, products such as SILSBOND (commercially available from Ecosil).

In an embodiment, the water-dispersible or water-reducible polymer or binder resin is an epoxy or epoxy-functional resin having one or more functional groups capable of reacting with an external crosslinker. In an aspect, the crosslinker is a second polymeric resin or binder capable of reacting with the epoxy-functional resin. In an aspect, the crosslinker is waterborne or water-dispersible. Suitable crosslinkers include, for example, hydroxyl-reactive curing resins such as phenoplasts, amine-functional compounds, isocyanate-functional compounds and the like.

In a preferred embodiment, the composition described herein includes at least one amine-functional crosslinker. Suitable amine-functional crosslinkers include, for example, polyamines and their derivatives, polyamides, amido-amine-functional polymers, and the like. In a preferred aspect, the crosslinker is a polyamide. Polyamides are formed by the reaction of diamines or polyamines with monofunctional or difunctional fatty acids (dimer acids).

Exemplary dimer acids are prepared by acid-catalyzed oligomerization of unsaturated fatty acids such as tall oil fatty acid (TOFA), fatty acids derived from soya, cotton, castor oil, and the like, and include, without limitation, dicarboxylic acids having from 3 to about 40 carbon atoms, and more preferably dicarboxylic acids selected from aromatic dicarboxylic acids preferably having 8 to 14 carbon atoms, aliphatic dicarboxylic acids preferably having 4 to 12 carbon atoms, and/or cycloaliphatic dicarboxylic acids preferably having 8 to 12 carbon atoms. The dicarboxylic acids may be branched, non-linear or linear. Preferably, the dicarboxylic acids are branched or non-linear. Examples of suitable dicarboxylic acids are for example phthalic acid, isophthalic acid, terephthalic acid, 1,4-cyclohexanedicarboxylic acid, naphthalene-2,6-dicarboxylic acid, cyclohexanediacetic acid, diphenyl-4,4'-dicarboxylic acid, phenylenedi (oxyacetic acid), sebacic acid, succinic acid, adipic acid, glutaric acid and/or azelaic acid.

Exemplary diamines or polyamines for reaction with the dimer acid include, without limitation, aliphatic, cycloaliphatic, aliphatic-aromatic or aromatic diamines or polyamines. In a preferred aspect, the diamine is an aliphatic or cycloaliphatic diamine having preferably 2 to 12 carbon atoms, and may optionally include aromatic groups. Suitable aliphatic diamines include for example 1,2-ethylenediamine, 1,3-propylenediamine, 1,6-hexamethylenediamine, 1,12-dodecylenediamine, 1,4 cyclohexanebismethylamine, piperazine, p-xylylenediamine, m-xylylenediamine, isophoronediamine, and the like. The amine component may also comprise branching components to obtain branched polyamides. Suitable examples include for example di-alkylene-triamines such as for example, di-ethylene-triamine, di-alkylene-tetramines, di-alkylene-pentamines, di-hexamethylene-triamine, poly-functional acids such as for example 1,3,5-benzene tricarboxylic acid, trimellitic anhydride and pyromelitic anhydride and poly-functional amino acids such as for example aspartic acid and glutamic acid.

Suitable polyamides therefore include, for example, carboxy-functional polyamides, hydroxy-functional polyamides, amine-functional polyamides, and the like, formed by the reaction of a dimer acid with a diamine as indicated above. The polyamines may be linear, branched, or dendritic. The polyamides may be thermoset or thermoplastic, and amorphous or crystalline. In an aspect, the polyamide used in the composition and method described herein has amine equivalent weight of about 250, preferably 100 to 200.

In an embodiment, the coating system described herein includes a two-component composition that includes an epoxy or epoxy-functional binder component and a polyamide crosslinker component. In an aspect, the ratio of epoxy or epoxy-functional binder to the polyamine in the composition is 0.5:1 to 3:1, preferably 1:1 to 2:1.

In an embodiment, the coating system described herein includes about 20 to 80 wt %, preferably about 35 to 75 wt % of the two-component composition, based on the total weight of the resin components. In an aspect, the coating system preferably includes about 5 to 50 wt %, more preferably about 10 to 30 wt % crosslinker, based on the total weight of resin components.

In an embodiment, the coating system described herein includes a carrier in which the binder component is dispersed. In an aspect, the carrier is an aqueous carrier, preferably 80 wt %, more preferably 80 to 90 wt %, and most preferably 90 to 95 wt % water, based on the total weight of the composition.

In an embodiment, the coating system described herein is used as a shop primer. The term "shop primer" refers to a temporary or short-term primer composition applied to a bare (i.e., uncoated or unprimed) metal substrate prior to final fabrication or assembly, and prior to application of a permanent primer and topcoat. If the shop primer is applied in one or more layers to a bare metallic substrate and no primer or topcoat is applied, the shop primer may be incapable of withstanding extended or long-term exposure to corrosive conditions (e.g., one week of salt spray exposure) without visual signs of deterioration or corrosion. However, for the shorter time periods or less corrosive conditions that arise in a typical manufacturing operation, such as, for example, during assembly by welding of large metal objects made of individual components of iron, steel, or other conductive metals, the shop primer may provide adequate corrosion protection or inhibition. Conventionally, shop primers include solvent-based two-part zinc-rich epoxy coating compositions that are known in the art to provide adequate corrosion resistance when applied at 0.005 to 0.02 mm coating thickness. Surprisingly, the coating system described herein is a water-based system that provides comparable or even superior corrosion resistance, without the disadvantages of a solvent-borne system.

In an embodiment, the coating system described herein is a weldable shop primer. The term "weldable" as used herein refers to a coating composition such that metal plates coated with a dried film of the composition may be welded together by automated arc welding equipment without having to remove the coating composition at the weld side to obtain a continuous, defect-free weld. In an aspect, the coating system described herein includes a water-dispersible composition that can be readily applied and air-dried or otherwise cured or hardened to provide a weldable shop primer.

In an embodiment, the coating system described herein is a shop primer with high electrical conductivity. Shop primer films preferably have high electrical conductivity such that welding through the primer film can be carried out using automated welding equipment without burning defects (such as holes, for example) through the metal component to which the shop primer is applied. In an aspect, the shop primer preferably has sufficient heat resistance such that any volatilization or combustion of the film on welding is limited to a small area that extends less than about 50 mm, preferably less than about 25 mm, on either side of a weld bead.

Accordingly, in an embodiment, the coating system described herein, in order to be weldable, includes at least one conductive material, preferably a conductive pigment. Exemplary conductive materials or pigments include, without limitation, particles, fibers, platelets, and other like shapes that can be easily dispersed in an aqueous carrier, and do not aggravate or contribute to corrosion primed or uncoated parts. Preferred conductive materials may include, for example, carbon, calcium, cobalt, copper, iron, nickel, and a variety of other less widely-used conductive materials. More expensive materials such as silver and antimony may be used but desirably are coated onto a less expensive conductive or nonconductive material to reduce the total cost. In an aspect, mixture of materials or pigments may be used.

Mixtures containing aluminum or zinc have been used in coating compositions, especially solvent-borne compositions, partly due to widespread practice in the industry based on a high zinc content being desirable for optimal performance. Conventionally, zinc has been used at high volume percentages in coating compositions. For example, a conventional solvent-borne composition may include at least about 40 to about 50 volume percent of the liquid composition. Without limiting to theory, it is believed, however, that aluminum powder, zinc powder or dust, and other elemental metals have undesirable side effects, including causing hydrogen evolution in the presence of water, promoting binder instability, and the like.

Accordingly, powdered elemental metals such as aluminum powder of zinc powder or dust may be used, but as part of a mixture of conductive materials, and/or in small amounts, coated or otherwise treated so as to reduce the risk associated with these materials. In an aspect, in the coating system described herein, zinc preferably represents less than half the conductive material weight in a conductive material or pigment. Preferably, zinc is used in an amount which would not provide an autoweldable composition. In a preferred aspect, if zinc is present in an elemental form or reactive form, the coating system described herein is substantially free of zinc, or even essentially free of zinc, i.e., the coating system contains less than about 5 wt %, preferably less than about 1 wt %, more preferably less than about 0.5 wt %, based on the total weight of the coating composition.

In an embodiment, zinc may be present in other less reactive, non-reactive, semiconductive or nonconductive forms. Exemplary forms of non-reactive zinc include, without limitation, zinc oxide, zinc silicate, and the like. In an aspect, the coating system may include at least about 30 wt %, preferably at least about 40 wt % zinc, based on the total weight of the coating composition.

In an embodiment, the coating system includes a conductive pigment or material that is carbonaceous, or in the alternative, a metallic material. Exemplary carbonaceous materials include, without limitation, carbon blacks, carbon fibers, graphite, metal-coated graphite powder, and the like. Exemplary carbonaceous materials include conductive carbon blacks (such as commercially available as KETJEN-BLACK (AkzoNobel), VULCAN (Cabot Corp), CONDUC-TEX (Columbian Chemicals Co), ENSACO (Timcal Graphite & Carbon)), nickel-coated graphite powders (such as commercially available as E-FILL (Sulzer Metco)), and the like. Exemplary metallic materials include, without limitation, Alcoa aluminum powder (Eckart America), antimony-doped tin oxide (such as commercially available as ZELEC ECP (Milliken and Co.)), copper powder or flake (such as commercially available as Copper Powder 8ED (Ferro Corp)), iron powder (such as commercially available from BASF and others), nickel powder (such as commercially available as E-FILL (Sulzer Metco)) and the like. Carbonaceous materials, including graphite, are especially preferred.

In an embodiment, the conductive pigment or material is included in the coating system described herein such that its conductivity and loading level provide a weldable coating system. Preferably, the conductive material represents at least about 0.5, at least about 1, at least about 2, or at least about 3 wt %, and up to about 30, up to about 20, up to about 10, or up to about 7 wt % of the coating composition described herein. Carbonaceous materials may be used in combination with metallic materials. The relative amount of carbonaceous conductive materials and metallic conductive materials are selected empirically based on the required coating and welding performance. In a preferred aspect, lower amounts of carbonaceous material, and higher amounts of metallic conductive metal are used. In terms of pigment volume concentration (PVC), the conductive material preferably represents about 2 to about 20% of the coating composition.

The shop primer described herein normally will contain an aqueous carrier, preferably water, as a component of the water-dispersible polymer and optionally, as an additional ingredient. Preferably, the coating composition contains sufficient water such that about 20 to 80 wt % solids and more preferably about 30 to 60 wt % solids are present when the shop primer is applied to a substrate.

The shop primer disclosed herein may comprise, consist essentially of, or consist of the coating composition including the polymer component and the crosslinking agent dispersed in an aqueous carrier, along with the conductive material. In an aspect, the shop primer may include other ingredients. For example, the shop primer may include one or more corrosion inhibitors. Suitable corrosion inhibitors include inorganic or organic materials including aluminum triphosphate, barium borophosphate, calcium phosphosilicate, calcium silicate, strontium phosphate, zinc phosphate, zinc oxide, mixtures thereof, and the like. The shop primers described herein preferably contain about 1 to 20 wt, more preferably about 1 to 10 wt corrosion inhibitors, based on the total weight of solids in the composition.

In addition, the shop primer disclosed herein may include other optional ingredients such as, for example, coalescents, initiators, coinitiators, synergists, and a variety of other adjuvants. Representative adjuvants are described in Koleske et al., *Paint and Coatings Industry*, April 2003, pp. 12-86).

The disclosed shop primer compositions may be applied to a variety of metal substrates including steel, iron, aluminum, zinc, and alloys thereof. The compositions may be applied using a variety of methods that will be familiar to those skilled in the art, including spraying, electrostatic coating, brushing, roller coating, flood coating and dipping. The shop primer may be applied at a variety of wet film thicknesses. Preferably, the wet film thickness is such as to provide a dry film thickness of about 1 to 100 µm, more preferably about 2 to 20 µm. The applied shop primer may be cured or hardened by a variety of drying techniques or devices familiar to those of skill in the art, including air drying, forced drying, and the like. For forced drying, the applied shop primer is dried in an oven, at temperatures of preferably about 30° C. to 205° C. and heating times less than 60 minutes, preferably less than 30 minutes, less than 15 minutes, less than 10 minutes, and less than 5 minutes.

The disclosed shop primer compositions are applied to metal components prior to assembly by welding. Welding can be carried out using techniques and materials known to those of skill in the art, and preferably, welding near or over the shop primer film does not cause airborne emission of unsafe amounts of zinc, heavy metals, and/or other harmful substances. The shop primer preferably emits few or no harmful or objectionable byproducts, and does not harm the quality of the weld bead. Conventionally, after welding, shop primer at or near the weld is removed (for example, by shot blasting) for inspection, particularly of the area near the weld. After inspection, the deprimed areas are either reprimed with more shop primer, or coated with a non-conductive permanent primer applied at greater thickness than the shop primer, and optionally, a suitable topcoat that provide extended corrosion protection and the desired appearance.

The disclosed shop primer composition may be applied to a wide variety of metal articles or metal components of large metal articles. Representative end-use applications for the shop primer include refrigerated containers, unrefrigerated containers (also known as dry cargo containers, or intermodal shipping containers) from a wide variety of suppliers or manufacturers. Other representative end uses include chassis, trailers, semitrailers, rail cars, truck bodies, ships and other vessels, bridges, building skeletons, and other prefabricated or site-fabricated metal articles needing temporary indoor or outdoor corrosion protection during fabrication or assembly. Additional uses include metal angles, channels, beams (such as I-beams, for example), pipes, tubes, plates and other components that may be welded together to make large metal articles.

EXAMPLES

The invention is illustrated by the following examples. It is to be understood that the particular examples, materials, amounts, and procedures are to be interpreted broadly in accordance with the scope and spirit of the inventions as set forth herein. Unless otherwise indicated, all parts and percentages are by weight and all molecular weights are weight average molecular weight. Unless otherwise specified, all chemicals used are commercially available from, for example, Sigma-Aldrich, St. Louis, Mo.

Test Methods

Unless indicated otherwise, the following test methods were utilized in the Examples that follow.

Adhesion Test

Adhesion testing is performed to assess whether the coating adheres to the coated substrate. The adhesion test was performed according to ASTM D 3359 (Standard Method for Adhesion by Tape Test).

Flexibility Test

The level of flexibility of a coating and the extent of cure is tested using the mandrel bend method. The test was performed according to ASTM D522 (Standard Test Methods for Mandrel Bend Test for Attached Organic Coatings). Results are expressed as the length (in mm) to which a coating film can be elongated (or bent) before the film cracks.

Impact Resistance

The direct and reverse impact resistance of cured coatings is tested using the methods described in ASTM D2794 (Standard Test Method for Resistance of Organic Coatings to the Effects of Rapid Deformation). Briefly, the coatings to be tested are applied to metal panels and cured. A standard weight is dropped a specific distance to strike an indenter that deforms the cured coating and the substrate to which it is applied. Results are expressed as the weight (in lb) dropped when the coating fails, typically by cracking.

Corrosion Resistance (Salt Spray)

The corrosion resistance of cured coatings prepared from the composition described herein is tested using the salt fog method, as described in ASTM B117 (Standard Practice for Operating Salt Fog Apparatus). Results are expressed on a scale of 0-10, where "0" indicates the coating is completely corroded, observed by bubbling or blistering of the film in all areas, and "10" indicates the coating is unchanged from before it was subjected to the corrosive environment. Rust ratings for coatings subjected to salt fog exposure in a humid environment are also expressed on a scale of 0-10 where "0" indicates complete surface rust, and "10" indicates no surface rust.

Corrosion Resistance (CCT)

Cyclic corrosion testing (CCT) is a standard method for accelerated corrosion testing. Test panels are typically exposed to repeated cycles of intermittent exposure to salt solution, elevated temperature and/or humidity and drying. The panels are then evaluated for visible signs of corrosion.

Corrosion Resistance (IICL)

The International Institute of Container Lessors provides specifications for coatings used in the manufacture of shipping containers. The specifications include certified tests for corrosion resistance, mechanical resistance and appearance, and are scored on a scale of 1 to 100, with corrosion resistance having the most weight. A score of at least 70 on this scale must be obtained in order to meet IICL specification.

Heat Resistance

Test panels are sprayed with the coating system of the invention and then tested for heat resistance by exposing the panels to temperatures above the typical use temperature of a container. Test temperatures are selected to mimic extreme conditions, i.e., direct sunlight, high ambient temperatures, and panels coated with dark colored coating systems. Panels are evaluated for heat resistance based on the time to cracking, peeling, and/or blister formation.

Water Soak Testing

Test panels are sprayed with the coating system of the invention. The coating is allowed to dry, and coated panels are then wetted by standard ways known to those of skill in the art, including, for example, by immersing, rinsing, washing or soaking the coating or coated panel in deionized water. Panels are evaluated for corrosion performance based on the time to adhesion failure.

Example 1

Exemplary shop primer formulations #1 through #7 were prepared with the polymer components shown in Table 1, either with zinc or without, and combined with ingredients in shown below in Table 2, according to methods known in the art. The amounts shown in Table 2 are weight percentages, based on the total weight of the composition.

TABLE 1

Polymer Components in Shop Primer Formulation

| Formulation No. | Polymer Component | Zinc (+/−) |
|---|---|---|
| 1 (control) | Epoxy (2K; solventborne) | + |
| 2 | Silicate | + |
| 3 | Epoxy (2K; waterborne) | − |
| 4 | Epoxy (2K; waterborne) | + |
| 5 | Acrylic (waterborne) | − |
| 6 | Acrylic (waterborne) | + |
| 7 | Silane | − |

TABLE 2

Shop Primer Formulations

| Ingredient | Amount (wt %) |
|---|---|
| Polymer component | 10 to 20 |
| Crosslinking agent | 1 to 5 |
| Pigment | 1 to 5 |
| Conductive pigment | 1 to 5 |
| Pigment dispersant | <1 |
| Anti-settling agent A | <1 |
| Anti-settling agent B | <1 |
| Defoamer | <1 |
| Flow agent | <1 |
| Solvent A (if used) | 1 to 5 |
| Solvent B (if used) | 5 to 10 |
| Water | 15 to 25 |
| Zinc (if used) | 30 to 40 |

Example 2

The resulting shop primer formulations were spray-applied to a bare steel substrate and air dried. The ease of application (sprayability, flow, dry time), corrosion resistance (salt spray resistance, cyclic corrosion testing, IICL testing), heat resistance, and physical performance characteristics (cross-hatch adhesion, impact, flexibility) of each formulation were evaluated and are reported in Table 3. Performance is reported on a scale of 1 to 5, where 1 represents the worst performance and 5 represents the best performance.

TABLE 3

| Formulation | Application | Water soak | Salt spray | Cyclic | Heat | Physical | HCL |
|---|---|---|---|---|---|---|---|
| 1 | 5 | 5 | 4 | 4 | 4 | 4 | 5 |
| 2 | 3 | 5 | 5 | 5 | 4 | 2 | 4 |
| 3 | 5 | 5 | 2 | 4 | 4 | 5 | 3 |
| 4 | 5 | 5 | 5 | 5 | 4 | 4 | 5 |
| 5 | 4 | 4 | 4 | 5 | 4 | 4 | 4 |
| 6 | 4 | 4 | 4 | 5 | 4 | 4 | 4 |
| 7 | 5 | 4 | 4 | 5 | 5 | 5 | 4 |

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims. The invention illustratively disclosed herein suitably may be practiced, in some embodiments, in the absence of any element which is not specifically disclosed herein.

What is claimed is:

1. A method of making a corrosion-resistant metal article, comprising
   providing an article having a metal substrate;
   applying thereon a coating composition comprising, based on the total weight of the coating composition:
      a two-component composition including
         about 10 to 20 wt % of an epoxy polymer component having number average molecular weight ($M_n$) of 800 to 1500 and EEW of about 200 to about 500; and
         about 1 to 5 wt % of a polyamide crosslinker having amine equivalent weight is about 250; and
         about 15 to 25 wt % of an aqueous carrier in which the binder is dispersed;
      about 1 to 5 wt % of a conductive material;
      about 1 to 5 wt % of a pigment;
      about 1 to 5 wt % of a first solvent;
      about 5 to 10 wt % of a second solvent; and
      about 30 to 40% wt % of non-reactive zinc; and
   drying the coating to form a corrosion-resistant film at dry film thickness of about 2 to 20 μm on the metal substrate, wherein the film emits no harmful byproducts on welding.

2. The method of claim 1, wherein the conductive material is a conductive pigment selected from calcium, cobalt, nickel, iron, copper, carbonaceous material, or mixtures thereof.

3. The method of claim 2, wherein the carbonaceous material is selected from carbon black, graphite, or carbon fiber.

4. The method of claim 1, wherein the coating composition further includes a corrosion inhibitor.

5. The method of claim 4, wherein the corrosion inhibitor is selected from aluminum triphosphate, barium triphosphate, calcium phosphosilicate, calcium silicate and mixtures thereof.

6. The coating method of claim 1, wherein the corrosion-resistant film formed by drying is weldable.

7. The coating method of claim 1, wherein the metal substrate comprises steel, iron, aluminum, zinc, or alloys of iron, aluminum, or zinc.

8. The method of claim 1, wherein the composition is substantially free of elemental or metallic zinc.

9. The method of claim 1, wherein the composition includes less than about 1 weight percent of an anti-settling component.

10. The coating method of claim 1, wherein the metal substrate is a component of a prefabricated article requiring temporary corrosion protection during manufacture.

11. The coating method of claim 1, wherein the metal substrate is a component or part of a shipping container.

12. The coating method of claim 1, wherein the corrosion-resistant film formed by drying the composition is heat-resistant in a humid environment.

13. The method of claim 1, wherein the polyamide component is water-dispersible.

* * * * *